(Specimens.)
F. J. SEYMOUR.
METHOD OF OBTAINING ALUMINA FROM CLAY.
No. 382,273. Patented May 1, 1888.
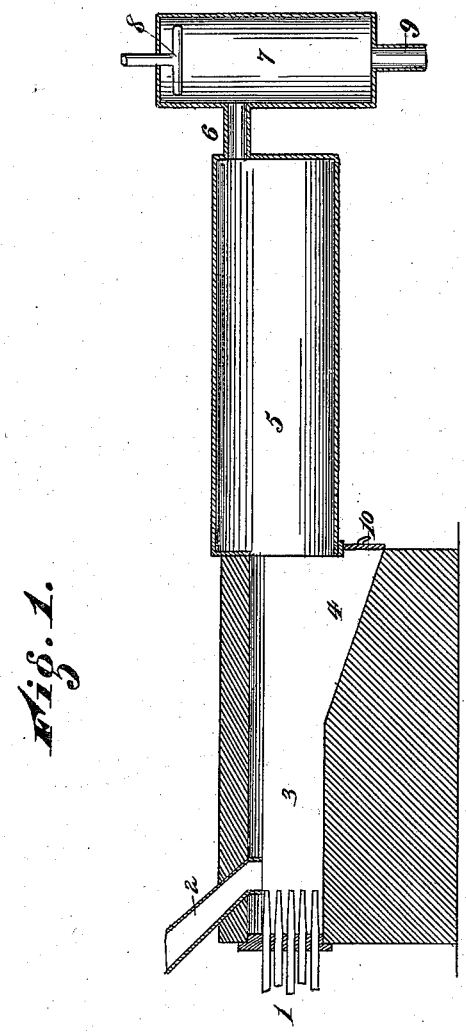
Attest.
J. Watson Sims.
Otto Eugd.
Inventor,
Fredrick J. Seymour
by Wood & Boyd
his Attorneys &c

UNITED STATES PATENT OFFICE.

FREDERICK J. SEYMOUR, OF FINDLAY, OHIO.

METHOD OF OBTAINING ALUMINA FROM CLAY.

SPECIFICATION forming part of Letters Patent No. 382,273, dated May 1, 1888.

Application filed April 25, 1887. Serial No. 235,962. (Specimens.)

*To all whom it may concern:*

Be it known that I, FREDERICK J. SEYMOUR, a resident of Findlay, in the county of Hancock and State of Ohio, have invented certain new and useful Improvements in the Method for Obtaining and Reducing Alumina, of which the following is a specification.

The object of my invention is to obtain, first, oxide of aluminum, and, second, metallic aluminum. This result is obtained by treating aluminous ores or earths in the presence of zinc to the direct action of heat in a vaporizing chamber or furnace.

Great difficulty has been experienced in the reduction of aluminum from ores or clays containing silica, because of the difficulty of separating the alumina from the silica. I overcome this difficulty by heating the aluminous earths or silicate ores in the presence of zinc until the latter is vaporized, and then passing the vapor mixed with finely-divided alumina and silica through a cooling-space, in which the silica is deposited, leaving the vapors or oxide of zinc mixed with alumina, which are passed on for further treatment, all of which will be more fully described in the following specification.

In order to illustrate the process, I have shown in the accompanying drawing one form of furnace which may be employed to carry on the same.

1 represents gas-burner pipes or nozzles placed in the front end of the furnace. Any known form of burners may be employed, using hydrocarbon gas, natural gas, or any other combustible material capable of being employed to produce high and rapid heat.

2 represents a chute, through which the material is introduced into the heated furnace.

3 represents the combustion-chamber proper, wherein the materials are vaporized and heated.

4 represents a passage or conduit leading out from the furnace-chamber.

5 represents a continuation of said conduit for vapors, oxides, or finely-divided materials. This is preferably made of copper or other metal for more rapidly cooling the vapors.

6 represents a flue or conduit connecting the condenser 5 with the secondary condenser 7, into which the vapors are passed from the condenser 5.

8 represents a coil of pipe with jets in for introducing spray for completely cooling down the vapors, which, as they cool, settle to the bottom of said condenser, and are carried out by a pipe at the bottom.

The preferred form of carrying on my process is as follows: I take kaolin or clay as rich in alumina and low in silica as possible. I prefer the clay from Lawrence county, Indiana, or similar varieties, as it is comparatively free from iron and other impurities. This clay may be prepared in the manner shown and described in Letters Patent No. 337,996, granted me March 16, 1886, or in an analogous manner. I prefer, however, to employ sixty parts of clay, forty parts of carbonate of zinc ore, three parts of carbonate of potassium, and one hundred parts of pulverized coke, thoroughly pulverized and mixed. The amount of carbon I employ depends somewhat on the amount of silica in the two ores. I prefer one part of carbon to one of silica. This prepared material is fed to the flame in the furnace, which is heated to about 2,000° Fahrenheit. At this temperature, which may be considerably varied, but should not be decidedly below the point at which zinc sublimes, the zinc is volatilized and then largely or wholly oxidized, and, together with the alumina and much of the silica, passes out of the fire-chamber, and from time to time new materials are fed into the furnace, so as to obtain a continuous supply of vapors intermixed with finely-divided matter and oxides. The silica cools more rapidly than the zinc and alumina. The larger part of that which is not left behind or sooner deposited falls on the bottom of the passage 4, the alumina and zinc vapor passing forward through the conduit 5. A jacket of water or other cooling medium may be applied to this conductor 5, so as to more rapidly cool the zinc and the alumina. Before they pass out of this conductor or cooling-chamber the silica and potassium will have become cool and separated for the most part from the vapors or oxides of zinc and from the alumina. These pass out through the conductor 6 into the condenser 7, and are precipitated to the bottom. In order to hasten this precipitation, I sometimes introduce a fine spray or other cooling medium through the spraying-pipe 8; or I apply a cooling medium to the exterior surface of said condenser 7. If water is employed, it is passed out of the pipe 9 at the bottom, carrying out of it the oxide of alumina and zinc. The water is separated by evaporation from the outside.

The oxides of alumina and zinc thus obtained are suitable for a great number of uses in metallurgical operations—as, for example, for the alloying of metals. The oxides may be treated so as to separate the zinc from the alumina and metallic aluminum obtained.

In another application filed of even date herewith, and styled "Case No. 5," I have described and claimed the processes of using this oxide, either singly or combined, for the alloying of metals.

In order to obtain pure aluminum from the combined oxides of zinc and aluminum, I prefer the following treatment: I mix with the oxides pulverized carbon or other deoxidizing agent and place this mixture in a crucible or in a reducing-chamber. I also introduce either metallic zinc or aluminum and gradually raise the heat, stirring the mass until it has fused or liquefied. This is continued until the metal has become united, when it may be poured into ingots for use for an alloy of zinc and aluminum; or, instead of pouring when the mass has become thoroughly molten and mixed, the heat may be continued and the zinc driven off by distillation when the aluminum is poured into ingots for use. Should the aluminum thus obtained not be entirely free from zinc, it may be introduced into a crucible or furnace and raised to a degree of heat sufficient to vaporize zinc, but not high enough to melt aluminum, and held at that heat until the zinc has been thoroughly evaporated or distilled out of the mass, and a comparatively pure article of aluminum is obtained. If the clay, kaolin, or alumina employed by the reduction herein contains iron, lime may be added to the mixture to throw down the iron, which will solidify and drop down in the cooling-passage; and so other impurities, when they exist in small quantities only, may be removed in the same manner by a reagent under the direct action of the heat upon the mass to convert it into vapor, the vapor or oxide of zinc and the alumina being so light that they together free themselves from the other metallic impurities. I sometimes introduce ammonia in small quantities to assist the separation of the zinc vapor or oxide and alumina.

I believe I am the first to separate alumina from silica after they have been highly heated in the presence of zinc by slow cooling and deposition. I prefer in this process the direct action of the flame and gases in an active state of combustion upon the materials employed; but the same process may be carried on by means of radiant heat, though to a less perfect degree, and the silica separated while in a finely-divided condition from the alumina.

Instead of carbon, phosphorus may be used as a deoxidizing agent to assist the initial separation of the aluminum from its associate elements. So, also, metallic zinc may be used instead of zinc ore; but it is not so cheap.

In the use of aluminous earths or oxide of aluminum containing little or no silica it is not essential to use a deoxidizing agent when an air-blast flame is directed upon the material to be reduced, as the oxygen is taken up directly as a part of the product of combustion by the ignition and burning of the gases. For this purpose oxide of aluminum and metallic zinc may be vaporized, the zinc serving as a flux for the aluminum and the combustion of the gases serving as a deoxidizing agent.

My present invention differs from that described in Letters Patent No. 337,996, granted me March 16, 1886, in several particulars.

By the present process I am enabled to vaporize the metal as soon as the heat is raised sufficiently to vaporize zinc ores, and it can be carried on rapidly because of the large cooling and condensing chamber and the rapid manner in which the vapor is allowed to escape.

Second, because of the means provided for the separation of the silica, which is carried over to some extent with the vapors of zinc and aluminum. By the process herein described I am enabled to use aluminous earths and clays containing a large amount of silica, and yet make a practical ready separation of the reduced aluminum from the silica, much better than by any other process known to me.

Third, I am enabled to reduce the metals much faster and cheaper because of the direct application of the products of combustion to the charge to effect the reduction.

It has been proposed to mix pure alumina with a carbonaceous substance and heat the mixture to a red heat in a retort, in the presence of a hydrocarbon gas and under a pressure of twenty-five to thirty pounds, to produce a carbonaceous sponge. Said spongy mass was allowed to cool and then transferred to a crucible, and metallic zinc added to alloy aluminum, the zinc being afterward expelled from the alloy by heat. Such a process is not herein claimed, my improvement consisting in the specified method of producing mingled oxides of aluminum and zinc, and in fusing these with a metal and in the presence of a deoxidizing agent.

Having thus described my invention, what I desire to claim and secure by Letters Patent is—

1. The process of separating alumina from clay, kaolin, and other similar aluminous earths and reducing the same by mixing said substance with zinc, carbon, and a flux, and subjecting the same to the direct action of the products of combustion upon the charge, and driving the alumina, silica, and zinc in a finely-divided condition into a conduit or condenser, cooling and collecting the silica, subsequently cooling and collecting the mixed oxides of zinc and aluminum, and then reducing the oxides in a furnace in the presence of a deoxidizing agent and a metal such as zinc or aluminum, substantially as specified.

2. The process of separating alumina from clay, kaolin, and other similar aluminous earths and reducing the same by mixing said substance with zinc, carbon, and a flux, and subjecting the same to the direct action of the products of combustion upon the charge, and driving the alumina, silica, and zinc in a finely-divided condition into a conduit or condenser, cooling and collecting the silica, subsequently cooling and collecting the mixed oxides of zinc and aluminum, and then reducing the oxides in a furnace in the presence of a deoxidizing agent, substantially as specified.

3. The steps in the process of separating alumina from silica or clay to prepare the same for reduction, which consists in heating the silica and alumina with a flux and carbon and with zinc to about the vaporizing-point of the metal, in the manner specified, passing the finely-divided mixture thereby produced out of the heating-chamber, cooling and collecting the silica, then passing the oxides of zinc and aluminum to another conduit or chamber, and cooling and collecting them, substantially as specified.

In testimony whereof I have hereunto set my hand.

FREDERICK J. SEYMOUR.

Witnesses:
JAS. A. BOPE,
E. E. WOOD.